Figure 3:
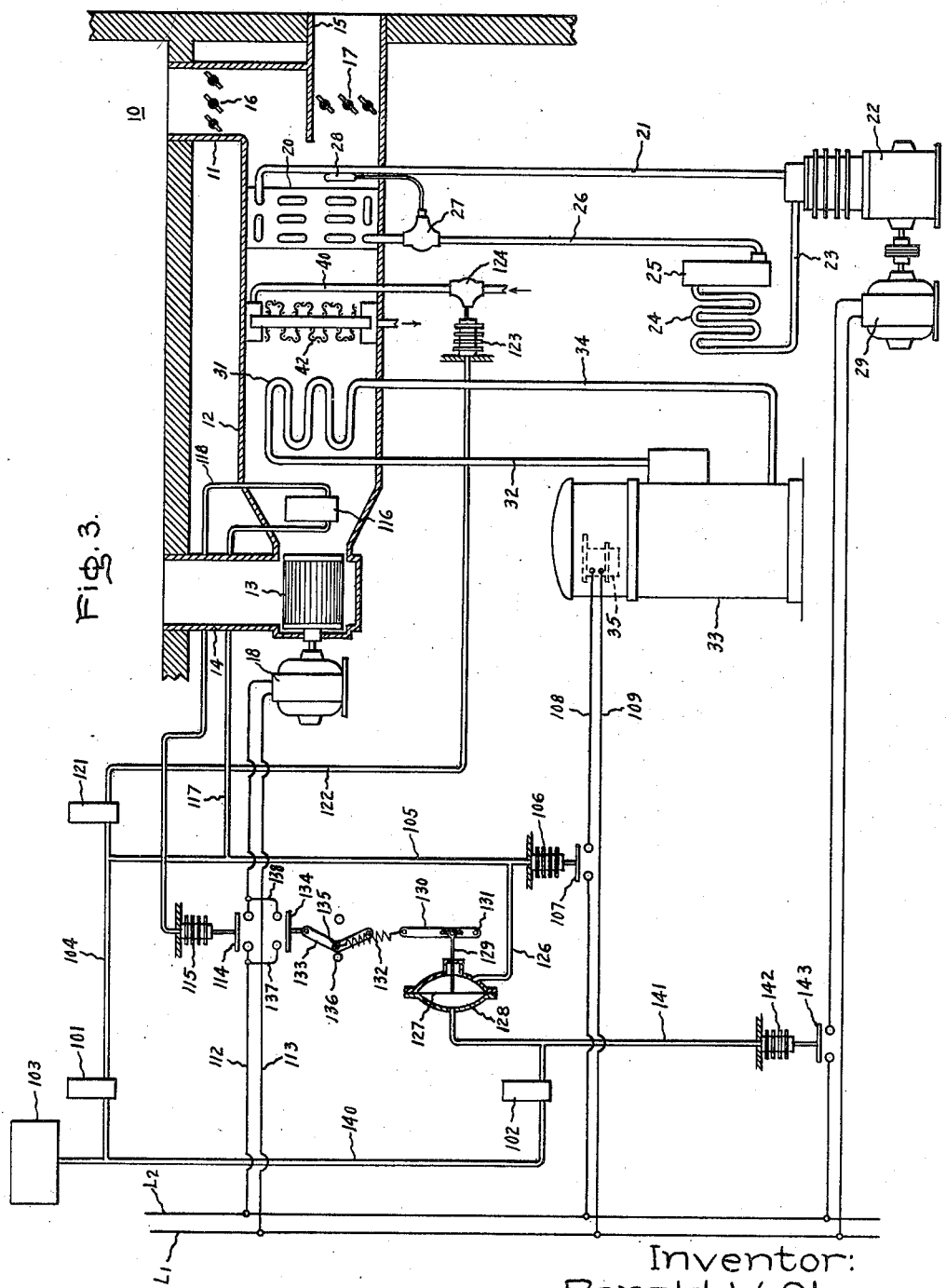

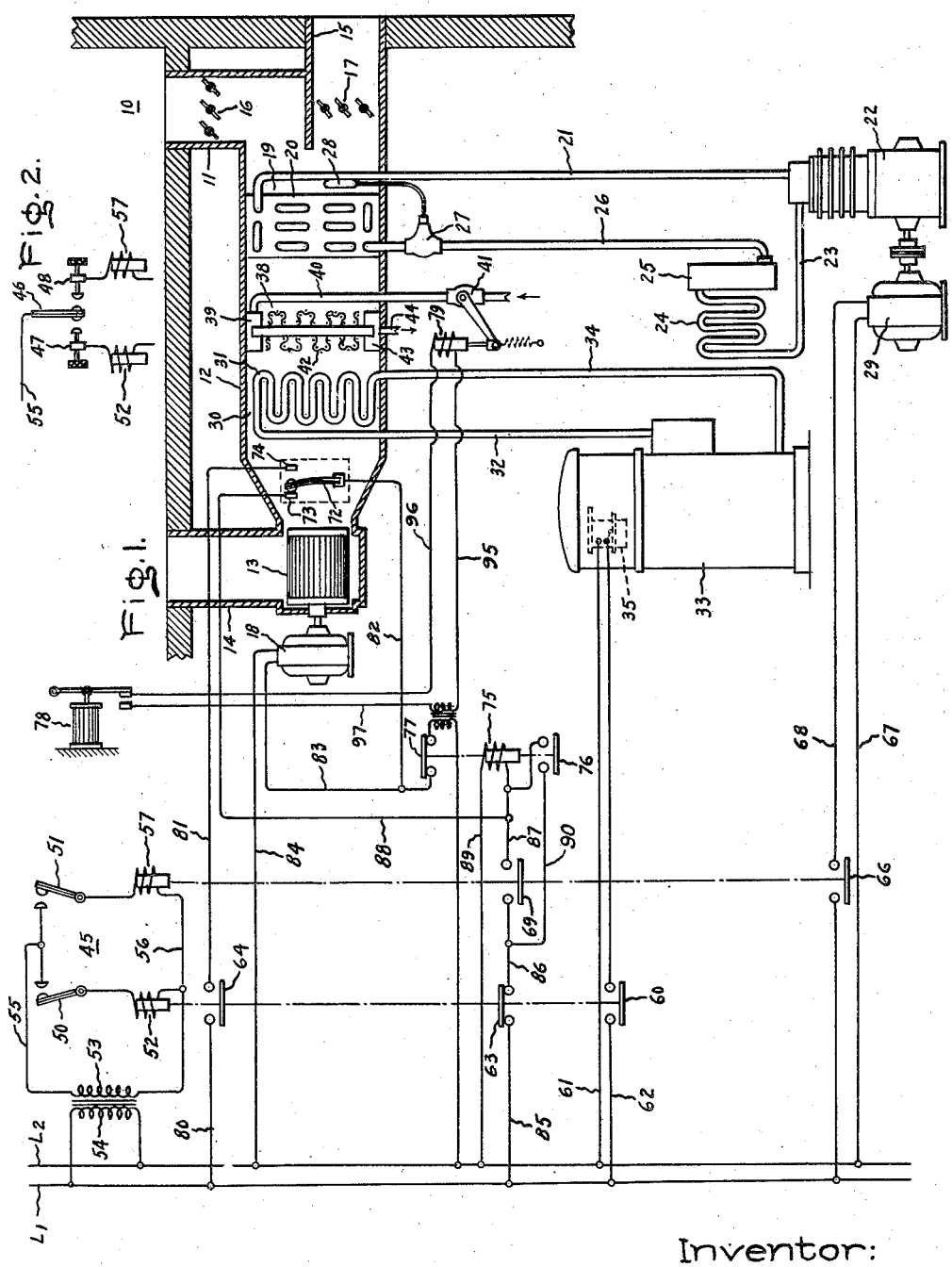

Inventor:
Ronald W. Olsen,
by Edwin L. Rich
His Attorney.

Patented Apr. 3, 1951

2,547,657

UNITED STATES PATENT OFFICE 2,547,657

THERMOSTATIC SELECTIVE HEATING, COOLING, AND CIRCULATING INTERLOCKING CONTROL SYSTEM

Ronald W. Olsen, Caldwell, N. J., assignor to General Electric Company, a corporation of New York Application October 30, 1947, Serial No. 783,054

6 Claims. (Cl. 257—3)

The invention relates to thermostatic selective heating and cooling temperature control systems involving a circulating heating and cooling medium and particularly to central plant year-round air conditioning systems having air heating, cooling and circulating elements separately operatable under thermostatic selective control. The invention provides thermostatic selective intermittent-continuous circulation interlocking control improvements that may be used with other heating and cooling temperature control systems and with electric or pneumatic control as desired.

The principal object is to provide an improved thermostatic selective interlocking control system for producing intermittent circulation of the air or other heat exchange medium jointly with the heating thereof to meet heating demands and continuous circulation of the air or other medium with intermittent cooling thereof to meet cooling demands.

Another object is to provide a heat exchange medium and space temperature responsive dual thermostatic interlocking control for starting operation of the heat exchange medium circulator upon operation of either the heater for the medium or the cooler for the medium while maintaining continuous operation of the circulator after any operation of the cooler until a subsequent operation of the heater occurs.

Another object is to provide an improved self-holding interlocking control relay system for automatically and sequentially interlocking a thermostatic heat exchange medium circulator control with a heater and cooler selective starting and stopping thermostatic control so that the circulator will be operated when the medium becomes heated upon each operation of the heater but upon starting operation of the cooler the circulator automatically is maintained continuously in operation until a subsequent starting of the heater.

The improved interlocked thermostatic selective control system is particularly advantageous for a year-round air conditioning system since it insures that during the heating season the air circulator does not run until the air is effectively heated thus avoiding cold drafts and also providing some reduction in the circulator operating costs while during the cooling season the air circulator will be run continuously to provide the benefit of the additional comfort obtained by constant air movement.

Further objects and advantages of the invention will appear in the following description of the accompanying drawing in which Fig. 1 schematically shows a central plant year-round electrically controlled air conditioning system embodying the thermostatic interlocking improvements of the present invention in a preferred form; Fig. 2 is a partial view showing a modified form of room temperature responsive thermostat that can be used in the control system shown in Fig. 1; and Fig. 3 schematically shows the invention embodied in a pneumatic control system for a central plant year-round air conditioning system such as shown in Fig. 1.

In the year-round air conditioning system shown in Fig. 1, the temperature of the space 10 is controlled by circulation of the air from the space through the duct 11 into the central plant year-round air conditioner 12 upon operation of the air circulator or blower 13 with the heated or cooled air returned to the space 10 through the duct 14. Fresh air may be admitted to the system through the fresh air duct 15 under the control of the proportioning dampers 16 and 17. The circulator or blower 13 is operated to circulate air from the space 10 through the air conditioner 12 upon energization of the electric motor 18 that drives the air circulator 13.

The air conditioner 12 is shown as provided with a conventional cooler 19 comprising the fin tube evaporative heat exchanger 20 connected by return line 21 with the refrigerant gas compressor 22 that supplies the refrigerant through pipe 23 to the condenser 24 and thence to the liquid receiver 25. The flow of liquid refrigerant in the line 26 to the evaporative heat exchanger 20 is controlled by the thermostatically operated flow regulating valve 27 having the bulb 28 responsive to the temperature of the gas return line 21. The compressor 22 is operated to cool the air circulating through the air conditioner 12 upon energization of the electric motor 29 that drives compressor 22.

The air conditioner 12 also is shown provided with a conventional air heater 30 comprising the air heating coil 31 to which steam or hot water may be supplied through pipe 32 from the boiler furnace 33 having the return line 34 connected to the other end of coil 31. The boiler furnace 33 is provided with suitable automatic firing means for starting the furnace into operation to heat the air in the conditioner 12, such means being illustrated schematically as an automatic oil burner 35.

The air conditioner 12 also may be provided with a suitable humidifier 38 illustrated schematically as of the drip type having water supplied to the drip pan 39 through pipe 40 under the control of the electromagnetically operated valve 41 with the water passing through perforations in the bottom of pan 39 over the humidifying screens 42 located in the path of the air flow. The excess water collected by the pan 43 is discharged to the drain 44.

Selective operation of the air cooler 19 for cooling the air and the air heater 30 for heating the air is controlled by thermostatic means 45 responsive to corresponding variations in the temperature of the air in the space 10 in different temperature ranges. As schematically shown in Fig. 1 a conventional adjustable heating control thermostat 50 and a conventional adjustable cooling control thermostat 51 may be used although it will be understood that a suitable single blade combined heating and cooling selective thermostat 46 such as shown in Fig. 2 with separately adjustable contacts 47 and 48 may be used if desired.

The heating control thermostat 50 of Fig. 1 controls the energization of the heating control switching relay 52 from the secondary 53 of a transformer having its primary winding 54 continuously energized from the supply lines L1, L2 with the energizing circuit extending through conductors 55 and 56. The cooling control thermostat 51 similarly controls the energization of the cooling control switching relay 57. It will be understood that the cooling control thermostat 51 may normally be set to energize relay 57 when the temperature in space 10 increases above a desired value, for example 80° F., while the heating control thermostat 50 may be set to energize relay 52 when the temperature of space 10 falls below a different desired value, for example 72° F. Thus the selective heating and cooling starting and stopping of the air conditioner 12 will normally occur in different temperature ranges.

The heating control switching relay 52 is provided with a normally open heating circuit controlling contact 60 that closes upon energization of the relay to energize the burner motor 35 from the supply lines L1, L2 through the conductors 61, 62. Relay 52 also is provided with the normally closed interlocking contact 63 and the normally open interlocking contact 64 that cooperate with the self-holding interlocking switching relay 75 in selectively controlling the intermittent-continuous operation of the blower driving motor 18 as more fully described hereinafter.

The cooling control switching relay 57 is provided with a normally open cooling circuit controlling contact 66 that is closed upon energization of the relay to complete an energizing circuit for the compressor driving motor 29 from the supply lines L1, L2 through the conductors 67, 68. Relay 57 also is provided with a normally open interlocking contact 69 that cooperates with relay 75 in controlling the operation of the blower driving motor 18.

During heating operation of the air conditioner 12, the intermittent operation of the blower driving motor 18 is jointly controlled by the heating control thermostat 50 and a co-operating interlocking thermostat 72 that is responsive to the temperature of the air in the air conditioner 12. Interlocking thermostat 72 engages with contact 73 when the air is cold or below its normal heating value and with the contact 74 when the air is heated to its normal heating value. This normal heating value is in the neighborhood of 130° F. to 140° F. During cooling operation of the air conditioner 12, the starting into operation of blower motor 18 is under the joint control of cooling thermostat 51 and the interlocking thermostat 72 in its cold position but continued operation of the blower is independently maintained by the self-holding interlocking relay 75 until heating operation subsequently occurs.

Operation of Fig. 1

If the temperature in space 10 falls so that heating thermostat 50 closes its contacts, relay 52 is energized to close contact 60 and thereby start operation of the boiler furnace 33 to supply heating medium to the coil 31 and then heat the air in the air conditioner 12. At the same time the normally open interlocking contact 64 is closed and the normally closed interlocking contact 63 is opened. As soon as the operation of the boiler furnace 33 has become effective to heat the air in the conditioner 12, interlocking thermostat 72 will respond to engage with contact 74. This completes an energizing circuit for the blower motor 18 extending from supply line L1 through conductor 80, contact 64, conductor 81, contact 74, interlocking thermostat 72, conductors 82 and 83, blower driving motor 18 and conductor 84 to the other supply line L2. As a result, blower 13 is started into operation to circulate air from the space 10 through air conditioner 12 to be heated by the heating coil 31 and thus effect a transfer of heat to the space 10 to meet the heating demands. When the transfer of heat to space 10 becomes sufficient to raise the temperature above the desired value, thermostat 50 opens its contacts to deenergize relay 52 and thereby stop operation of both the furnace operating burner motor 35 and the blower driving motor 18. Thus during heating operation of the air conditioner 12 the air circulator is operated jointly with the air heater and the operation is intermittent in accordance with the heating demands.

If the temperature in space 10 increases so that the cooling control thermostat 51 closes its contacts, then relay 57 is energized and closes its normally open contact 66 to start operation of the compressor driving motor 29 to supply cooling refrigerant to cool the air passing through heat exchanger 20 in the air conditioner 12. Under such temperature conditions the interlocking thermostat 72 will normally engage with its cold contact 73. Hence when the interlocking contact 69 of cooling relay 57 closes, an energizing circuit for operating the blower driving motor 18 jointly with the air cooler will be established extending from the supply line L1 through conductor 85, the normally closed contact 63 of heating control relay 52, conductor 86, contact 69, conductor 87, conductor 88, contact 73, interlocking thermostat 72, conductors 82 and 83, the blower driving motor 18 and conductor 84 to supply line L2. As soon as interlocking contact 69 is closed, the interlocking relay 75 becomes energized with the energizing circuit therefor extending from the supply line L1 through conductor 85, the normally closed contact 63 of the heating control relay 52, conductor 86, contact 69, conductor 87, the operating winding of relay 75 and conductor 89 to supply line L2. Upon the resulting response of relay 75, its normally open self holding contact 76 is closed so as to maintain relay 75 energized through conductor 90 that shunts the cooling relay contact 69. This shunt circuit through interlocking relay self-holding contact 76 insures that the blower driving motor 18 is maintained energized continuously even though the cooling control thermostat 51 responds to the cooling action of the refrigerating compressor operation and deenergizes relay 57 and thereby opens contact 69. In fact, when interlocking relay 75 once becomes energized, due to energization of the cooling control relay 57, the only way that it can be deenergized by by a subsequent operation of the heating control relay 52 so as to open its interlocking contact 63. In this way the self-holding interlocking relay 75 insures continuous operation of the air circulator 13 upon operation of the cooler 19 until a subsequent operation of the heater 30 is required.

As schematically shown in Fig. 1, the interlocking relay 75 also is provided with a normally closed contact 77 that serves to open the primary of the control transformer and thereby prevent the humidostat 78 that is responsive to the humidity of the air in the space 10 from energizing the operating electromagnet 79 and the water control valve 41 of the humidifier 38 during cooling operation of the air conditioner 12. The energizing circuit for the humidifier operating electromagnet 79 extends through conductors 95, 96 and 97.

While the automatically fired boiler furnace 33 has been schematically illustrated in Fig. 1 for supplying heating medium to the heat exchanger coil 31, it will be understood that a suitable electrically operated steam or water flow control valve may be used in place of the furnace 33 if desired.

With the pneumatic control system embodying the invention shown in Fig. 3, selective heating and cooling is initiated under the control of the heating control thermostat 101 and the cooling control thermostat 102, each of which may be of conventional form adapted to admit pressure from a suitable source 103 to the several pneumatically operated devices controlled thereby. Thus when heating is required, the heating control thermostat 101 admits pressure through tubes 104 and 105 to the operating bellows 106 that closes the normally open contact 107 to start operation of the burner mechanism 35 of the furnace 33. The burner mechanism 35 is shown connected through the conductors 108 and 109 to be energized from the electrical supply lines L1, L2 upon closure of the pneumatically operated, normally open, contact 107.

Similarly the blower motor 18 is shown connected by conductors 112 and 113 to be energized from the supply lines L1, L2 upon closure of the normally open contact 114. Contact 114 is closed by the admission of pressure to the operating bellows 115 therefore under the control of the heat exchange thermostat 116 that may be of the conventional type to admit air pressure from the tube 117 to the tube 118 when the air in the central plant air conditioner 12 is heated to a desired temperature value, for example, 130° or 140°. Thus, the driving motor 18 or blower 18 can not be energized during heating operation of the air conditioner until the furnace 33 has been set into operation to supply heating medium to the air heater 31 and effectively raise the temperature of the air to a value that will not result in circulating objectionably cool air in the space 10. During heating operating air pressure may be admitted by the humidostat 121 from tube 104 to tube 122 in order to expand the operating bellows 123 and thereby admit water through valve 124 to the air humidifier 38 as required to maintain desired humidity conditions.

Whenever air pressure is admitted to the furnace starting operating bellows 106, at the same time air pressure is supplied through pipe 126 to the right hand side of the interlocking diaphragm 127 having its periphery changed in the split casing 128 and connected by means of the operating rod 129 with the lever 130 that is pivoted at its lower end on the pivot pin 131. The upper end of lever 130 is connected by the over-center spring 132 to the knee of the toggle levers 133 that serve to open and close the interlocking blower control contact 134. Thus with pressure always exerted upon the righthand side of diaphragm 127 during heating operation, lever 130 will carry spring 132 over the center pivot 135 of the toggle lever and thereby bias the toggle levers 133 to buckle into engagement with the stop 136 and thereby always open contact 134 that is connected by conductors 137 and 138 in shunt with the pneumatically operating switch contact 114.

Thus as soon as heating operation is started, the energization of the blower driving motor 18 is always placed under the control of the pneumatically operated contact 114 that is closed under the control of the heat exchange thermostat 116. Also whenever heating is initiated and contact 134 is opened by the admission of pressure on the right hand side of diaphragm 127, the over center spring and toggle interlocking mechanism is such that the contact 134 will remain in the open position even though the pressure is removed from the right hand side of diaphragm 127 until pressure is admitted to the lefthand side of the diaphragm 127 during cooling operation as described below.

During cooling operation, the cooling control thermostat 102 admits pressure from the source 103 through tube 140 to tube 141 thereby expanding bellows 142 to close contact 143 and thereby energizes the driving motor 29 for compressor 22 with the energizing circuit extending from the supply lines L1 and L2 through conductors 144 and 145. At the same time, air pressure is admitted to the left hand side of the diaphragm 127. In this case, the diaphragm 127 operates through arm 129 to move lever 130 to the right and thereby carry the operating spring 132 over the center pivot 135 of the toggle operating arm 133. As a result the toggle arms 133 are moved out of engagement with stop 136 and straightened so as to close with switch contact 134 and thereby energize the blower driving motor 18 through conductors 112 and 113 so as to start operation of the air circulator 13 substantially at the same time that compressor 22 is started into operation.

When the operation of compressor 22 produces sufficient cooling of the air circulated from the central plant air conditioner 12 by the air circulator 13 into the space 10, then the cooling thermostat 102 will respond to cut off the air pressure from the operating bellows 142. As a result, contact 143 will be returned to its normally open position, thereby deenergizing the compressor driving motor 29. At the same time the pressure is relieved from the left hand side of the diaphragm 127 and lever 130 is returned to its mid-position in which it is shown. However, in this case spring 132 will not be moved over the central pivot 135 of the toggle levers 133 and consequently the toggle lever 133 will remain in engagement with stop 135 and thereby maintain contact 134 in its circuit closing position to maintain motor 18 energized and thus continue the operation of the air circulator 13 even though the compressor 32 is shut down. The over center spring and toggle arrangement is such that when once straightened so as to close contact 134 to operate the air circulator 13 during cooling operation, the air circulator will be maintained in continuous operation thereafter until a subsequent heating operation is produced under the control of the heating control thermostat 101 so as to admit pressure to the right-hand side of diaphragm 127 and thereby return the over center spring 132 and the toggle levers 133 to their respective positions shown in Fig. 3.

Thus the pneumatic system shown in Fig. 3 provides intermittent operation of the air circulator 13 along with the heating of the air during the heating season and continuous operation of the air circulator 13 with intermittent operation of the compressor 22 during the cooling season. In this way the added benefit of the cooling effect resulting from the continuous air circulation is made available selectively during the heating season without the chance for circulating cooling drafts in space 10 during the heating season.

What I claim as new and desire to secure by Letters Patent of the United States is:

1. An electric control for a heating, cooling and circulating system having in combination a heating circuit, a cooling circuit, thermostatic switching means selectively to close and open said circuits intermittently upon corresponding temperature variations, a circulation circuit having interlocking switching means to close said circulation circuit upon closure of said heating and cooling circuits, and circuit control means including a self-holding electroresponsive switching device controlled by said thermostatic switching means to maintain said circulation circuit closed after closure of said cooling circuit until a subsequent closure of said heating circuit.

2. An electric control for a heating, cooling and circulating system having in combination a heating circuit, a cooling circuit, a first thermostatic switching means selectively to close and open said circuits intermittently upon corresponding temperature variations, a circulation circuit having a second thermostatic switching means to close said circulation circuit after closure of said heating circuit, and circuit control means including a self-holding electroresponsive switching device controlled by said first thermostatic switching means to close said circulation circuit upon closure of said cooling circuit and maintain said circulation circuit closed until a subsequent closure of said heating circuit.

3. An electrical control for a heating, cooling and circulating system having in combination thermostatic switching means having heating and cooling circuits alternatively closed thereby, and a circulation circuit controlling relay having an energizing circuit including a pair of contacts closed by said thermostatic switching means upon closure of said cooling circuit and a self-closing holding circuit around said contacts opened by said thermostatic switching means upon closure of said heating circuit.

4. A pneumatic control for a heating, cooling and circulating system having in combination selective thermostatic valve means, pressure responsive heating and cooling, starting and stopping control elements selectively controlled thereby in response to corresponding temperature variations, and circulation starting and stopping control means having pressure responsive operating means under control of said selective thermostatic valve means for starting circulation upon starting operation of said cooling control element and stopping circulation only upon starting operation of said heating control element.

5. A temperature control system having in combination, a circulator for a heating and cooling medium, means for heating said medium, means for cooling said medium, a first thermostatic control means for selectively operating said heating means in accordance with temperature variations in a predetermined heating range, a second thermostatic control means for selectively operating said cooling means in accordance with temperature variations in a predetermined cooling range, circuit means including two alternate paths in parallel for supplying energy to said circulator, a first circulator actuating means including a switch in one of said paths and actuated by said first control means for operating said circulator intermittently during said heating range, a second circulator actuating means including a switch in the other of said paths for maintaining said circuit means closed during said cooling range for operating said circulator continuously, and means dependent upon actuation of said first thermostatic control means upon a demand for heating for rendering ineffective said second circulator actuating means.

6. A temperature control system having in combination, a circulator for a heat transfer medium, means for heating said medium, means for cooling said medium, a first thermostatic control means for selectively operating said heating means in accordance with temperature variations in a predetermined heating range, a second thermostatic control means for selectively operating said cooling means in accordance with temperature variations in a predetermined cooling range, circuit means including two alternate paths in parallel for supplying energy to said circulator, means including a switch in one of said paths and actuated by said first control means for operating said circulator intermittently during said heating range, a second switch in the other of said paths, means for locking said second switch closed during said cooling range to operate said circulator continuously, and means under the control of said first control means for opening said second switch upon a call for heating.

RONALD W. OLSEN.

REFERENCES CITED

The following references are of record in the file of this patent:

UNITED STATES PATENTS

| Number | Name | Date |
| --- | --- | --- |
| 2,137,833 | Crago | Nov. 22, 1938 |
| 2,155,256 | Crago | Apr. 18, 1939 |